July 28, 1942.  W. H. THOMAS  2,290,900
BATTERY CABLE FIXTURE
Filed Feb. 26, 1942
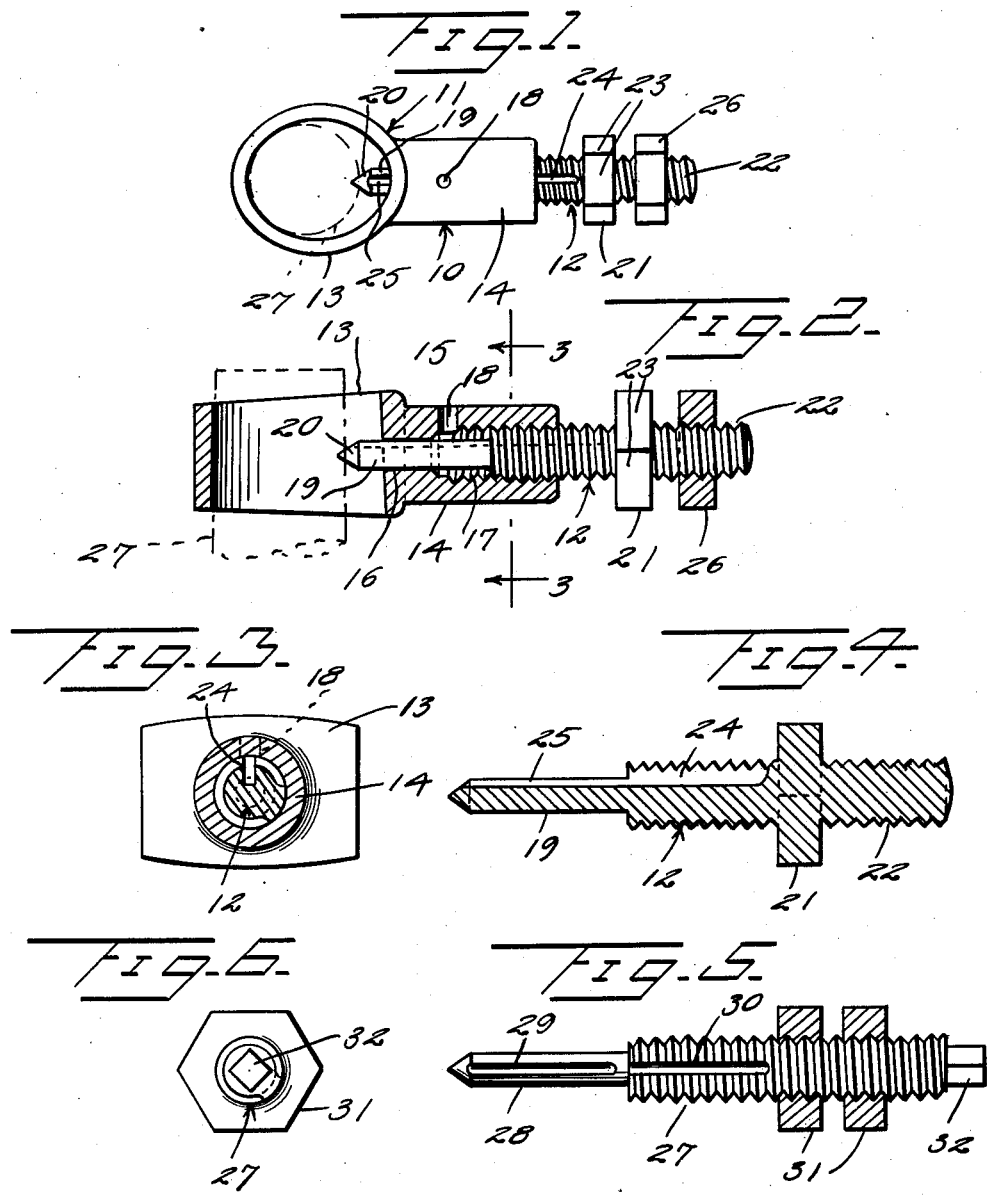
Inventor
William H. Thomas
By L. F. Randolph
Attorney

Patented July 28, 1942

2,290,900

UNITED STATES PATENT OFFICE 2,290,900

BATTERY CABLE FIXTURE

William H. Thomas, Little Falls, N. Y.

Application February 26, 1942, Serial No. 432,503

1 Claim. (Cl. 173—259)

This invention relates to a connector for connecting a cable to a battery post and more particularly to a connector of very simple construction and which includes a base or body member that can be formed from a plastic material such as hard, vulcanized fiber instead of metal, thus effecting a saving in brass or lead, of which said elements are ordinarily formed, and in addition, providing an element which will not be subject to corrosion, so that when released it can be readily removed from a battery post without having to be pried therefrom and possibly damaging the battery.

Still another aim of the invention is to provide a battery terminal connector having means for lubricating the parts thereof, and the connection with the battery post, to prevent the connector from rusting and to prevent corrosion from accumulating on the post.

Other objects and advantages of the invention will hereinafter become more fully apparent from the following description of the drawing, which illustrates preferred embodiments thereof, and wherein:

Figure 1 is a top plan view of one form of the connector,

Figure 2 is a longitudinal substantially vertical sectional view partly in elevation of the same, Figure 3 is a transverse sectional view of the connector taken substantially along a plane as indicated by the lines 3—3 of Figure 2, Figure 4 is a longitudinal sectional view of a portion of the connector, Figure 5 is a top plan view of a slightly modified part of the connector and which is shown partly in section, and Figure 6 is an end view in elevation of the same, looking toward the right hand end of Figure 5.

Referring more particularly to the drawing, wherein like reference characters designate like or corresponding parts throughout the different views, and referring particularly to Figures 1 to 4, 10 designates generally a battery terminal connector in its entirety and which includes a base or body member, designated generally 11 and a bolt designated generally 12.

The base or body member 11 includes a sleeve or ring portion 13 which is relatively wide and which is oval in shape, as seen in Figure 1. The base member 11 also includes a shank portion 14 which is formed integral with the sleeve member 13 and which projects outwardly from one end thereof. The shank 14 is provided with a bore, designated generally 15, which extends longitudinally therethrough and which includes a restricted inner end 16 which opens into the opening of the sleeve member 13, and an enlarged outer end 17 which opens outwardly of the outer end of the shank 14, and which is internally threaded. The shank 14 is provided with a downwardly extending lubricating port 18 which opens downwardly into bore portion 17 near its inner end.

The thread of the bolt 12 is a proper size to engage the thread of the bore portion 17, and the inner end of the bolt 12, which extends into the bore portion 17 is provided with a restricted unthreaded shank 19 which extends therefrom through the restricted bore portion 16 and into the opening of the sleeve member 13. Shank 19 is turnably and slidably disposed in the bore portion 16 to permit the bolt 12 to be advanced or retracted relatively to the shank 14, and the free end of the shank 19 terminates in a tapered point 20. Bolt 12 is provided with a collar 21 which is shown as being formed integral therewith and intermediate of its ends but which could obviously be rigidly secured thereto. The collar 21 is disposed on the exposed portion of the bolt 12 and spaced from the shank 14 so that the bolt 12 includes a threaded portion 22 beyond the collar 21. Collar 21 is provided with wrench lands 23 for receiving a turning tool by means of which the bolt 12 can be turned relatively to the shank 14. Bolt 12, between the collar 21 and its inner end is provided with a longitudinally extending groove 24 which aligns with and communicates with a longitudinally extending groove 25 in the restricted shank 19. A nut 26 engages the bolt portion 22.

Referring to Figures 1 and 2, a battery terminal or post is indicated in dotted lines at 27, and the sleeve or ring member 13 is adapted to be applied over post 27, with the bolt 12 in a retracted position. The bolt 12 can then be turned for advancing it inwardly of the shank 14 and for advancing the restricted shank 19 into the opening of the sleeve member 13 so that point 20 will engage and be imbedded in the post 27 for anchoring the connector 10 thereto. Likewise, when the shank 19 is forced into the post 27 the connector 10 will be caused to move to the right in Figures 1 and 2 so that the post 27 will be wedged in the restricted, left hand end of the sleeve member 13. An end of a connector cable, not shown, is then positioned between the nut 26 and the collar 21 after which the nut is advanced toward the collar for clamping the cable therebetween. It will thus be readily obvious that the bolt 12, including the threaded shank 19, will form a conductor between the cable and the battery post 27 so that the base or body member 11 need not be formed of a conducting material. Bolt 12 is intended to be disposed with the grooves 24 and 25 opening upwardly and the portion of the bore 17, between the inner end of the bolt 12 and the restricted bore portion 16 forms a chamber for a lubricant, preferably oil, not shown, which is supplied thereto through the port 18 and which is adapted to flow through groove 25 for lubricating the bearing surface between the shank 19 and the bore portion 16, and for supplying a lubricant to the post 27 to prevent corrosion accumulating thereon. The lubricant also flows through the groove 24 lubricating the threads of the bolt 12 and the bore portion 17 to enable the bolt to be readily turned. It will be obvious that the fiber body member 11, will not be subject to corrosion as are body members of other connectors formed of brass or lead.

In Figures 5 and 6 a modified form of bolt, designated 27, which is adapted for use with the body member 11, is illustrated. Bolt 27 is threaded to engage the bore portion 17 and has a shank 28, corresponding to the shank 19 except that the groove 29 thereof terminates in spaced relationship to the inner end of the bolt 27 and to the groove 30 of the bolt, which corresponds to the groove 24. Grooves 29 and 30 perform the same function as the grooves 25 and 24, respectively, and the bolt 27 is mounted in the same manner as the bolt 12 and the shank 28 performs the same function as the shank 19. Instead of being provided with a collar 21 and a nut 26, bolt 27 is provided with two nuts 31 which engage the exposed portion thereof and between which an end of a cable is adapted to be clamped. Bolt 27 is also provided with a restricted squared portion 32 at its outer end for receiving a turning tool for advancing and retracting the bolt relatively to the shank 14. In view of the detailed description of the bolt 12, a further description of the bolt 27 is deemed unnecessary.

Various other modifications and changes are contemplated and may obviously be resorted to, provided they fall within the spirit and scope of the invention, as hereinafter defined by the appended claim, as only preferred embodiments of the invention have been disclosed.

I claim as my invention:

A battery terminal connector comprising a base member having a sleeve at one end thereof for receiving a battery post, a shank projecting from a portion of the sleeve and provided with a bore which extends longitudinally therethrough, said bore having an inner restricted end which opens into the opening of the sleeve and an enlarged, outer end which is internally threaded; a bolt for engaging the threaded part of the bore, said bolt having a restricted shank which projects from its inner, shank end through the restricted end of the bore, the free end of the restricted shank extending into the sleeve opening for engaging the battery post to connect the connector thereto, the opposite end of the bolt protruding from the shank, and means carried by the last mentioned end of the bolt for clamping a cable thereto, the shank of the base member having a lubricating port which opens downwardly into the enlarged part of the bore, and said bolt and its restricted shank having longitudinally extending grooves for conveying a lubricant to lubricate the parts.

WILLIAM H. THOMAS.